(12) United States Patent
Hasegawa

(10) Patent No.: US 7,343,085 B2
(45) Date of Patent: Mar. 11, 2008

(54) AUTOMATIC BROADCAST PROGRAM RECORDER

(75) Inventor: Takashi Hasegawa, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 259 days.

(21) Appl. No.: 11/288,177

(22) Filed: Nov. 29, 2005

(65) Prior Publication Data

US 2006/0078299 A1    Apr. 13, 2006

Related U.S. Application Data

(63) Continuation of application No. 09/456,300, filed on Dec. 8, 1999, now Pat. No. 7,003,213.

(30) Foreign Application Priority Data

Dec. 10, 1998   (JP)   ................................ 10-351210

(51) Int. Cl.
*H04N 5/91* (2006.01)
(52) U.S. Cl. ........................ 386/95; 386/125; 725/58
(58) Field of Classification Search .................... 386/5, 386/6, 7, 46, 69, 70, 83, 95, 125, 126; 725/58, 725/133, 134, 141, 142, 153
See application file for complete search history.

(56) References Cited

U.S. PATENT DOCUMENTS

| 5,686,954 A | * | 11/1997 | Yoshinobu et al. ............ 725/58 |
| 5,802,244 A | * | 9/1998 | Kinebuchi .................... 386/83 |
| 5,802,300 A | | 9/1998 | Tanaka et al. |
| 6,038,367 A | * | 3/2000 | Abecassis ..................... 386/46 |
| 6,212,327 B1 | * | 4/2001 | Berstis et al. ................. 386/83 |
| 6,483,848 B1 | * | 11/2002 | Miura et al. ................. 725/141 |
| 7,003,213 B1 | * | 2/2006 | Hasegawa ..................... 386/83 |

FOREIGN PATENT DOCUMENTS

| JP | 335453 | 2/1991 |
| JP | 09200640 | 7/1997 |
| JP | 10042236 | 2/1998 |
| JP | 10164471 | 6/1998 |
| JP | 10210379 | 8/1998 |

OTHER PUBLICATIONS

"Digital Broadcasting Receiver" Journal of the Institute of Image Information and Television Engineers, vol. 51, No. 9, pp. 1364-1369.

* cited by examiner

*Primary Examiner*—John Miller
*Assistant Examiner*—Christopher Onuaku
(74) *Attorney, Agent, or Firm*—Mattingly, Stanger, Malur & Brundidge, P.C.

(57) ABSTRACT

A recorder capable of automatically recording a broadcast program without presetting recording of each program is disclosed. According to the automatic broadcast program recorder, keywords characterizing a program to be recorded are preliminarily designated, a reservation table of programs as candidates to be recorded is created by checking program information with the keywords each time the program information is updated, and video data of the program as a recording candidate is automatically recorded at the start time of the program stored in the reservation table.

9 Claims, 9 Drawing Sheets

FIG. 3

| | Reservation No. (61) | Keyword (62) | | | 60 |
|---|---|---|---|---|---|
| 60-1 | 1 | | | | |
| 60-2 | 2 | | | | |
| 60-3 | 3 | | | | |
| | ⋮ | | | | |

FIG. 4

| Channel (61) | Date and time of the program (72) | Metadata (73) | | 70 |
|---|---|---|---|---|
| 1 | XXXXXX~XXXXXX | | | 70-1 |
| | ⋮ | | | 70-2 |
| | ⋮ | | | 70-3 |
| 2 | | | | ⋮ |

| RESERVA-TION No. | CH | DATE AND TIME OF THE PROGRAM | METADATA | ⋮ | MATCHING RATIO | STATUS | |
|---|---|---|---|---|---|---|---|
| 1 | 3 | XXXXXX ~XXXXXX | | | | | 80-1 |
| | ⋮ | | | | | | 80-i |
| 2 | | | | | | | 80-j |

| RESERVA-TION No. | FILE NAME | |
|---|---|---|
| 3 | 1. mpg | 90-1 |
| 1 | 2. mpg | 90-2 |
| 4 | 2. mpg | 90-3 |
| 3 | 3. mpg | 90-4 |

| FILE NAME | DATA AND TIME OF THE PROGRAM | METADATA | |
|---|---|---|---|
| 1. mpg | XXXXXX−XXXXX | | |
| 2. mpg | XXXXXX−XXXXX | | |
| 3. mpg | XXXXXX−XXXXX | | |
| 4. mpg | XXXXXX−XXXXX | | |

92, 93, 94, 95

AUTOMATIC BROADCAST PROGRAM RECORDER

The present application is a continuation of application Ser. No. 09/456,300, filed Dec. 8, 1999, now U.S. Pat. No. 7,003,213 the contents of which are incorporated herein by reference.

BACKGROUND OF THE INVENTION

The present invention relates to an automatic broadcast program recorder and, more particularly, to an automatic broadcast program recorder adapted to automatic recording of a television program digitally broadcasted.

DESCRIPTION OF THE RELATED ART

In the case of reserving a television program, usually, the user himself/herself selects a program to be recorded by checking a television program page on newspaper, magazine, or the like and sets the data, time, and channel of the program or an identification code allocated to each program into a video recorder.

In a digital broadcast performed by using a communications satellite, for example, an electrical program guide called EPG is broadcasted. By using a special receiver having an EPG receiving function, the program table can be displayed on a television screen.

When the digital broadcast is performed at full scale in association with the spread of CS broadcast and CATV and the number of receivable television channels exceeds 100 channels, the amount of program information becomes enormous. In the method such that the user selects a program by checking a television program page on a newspaper or magazine or an electrical program guide, the possibility that a desired program is failed to be programmed due to an oversight of the program table is high. Even when the number of broadcast channels like the present terrestrial broadcasting is small, it often happens that a desired broadcast is missed because the user did not check the program table is advance.

SUMMARY OF THE INVENTION

It is therefore a first object of the invention to provide an automatic broadcast program recorder capable of automatically recording a desired program even when the user does not have to check the program table each time.

A second object of the invention is to provide an automatic broadcast program recorder capable of automatically recording a program desired by the user even when the number of television channels increases.

A third object of the invention is to provide an automatic broadcast program recorder suited to reproduce a plurality of programs which are closely related to each other in a time sequential manner.

In order to achieve the first and second objects, an automatic broadcast program recorder according to the invention is characterized by comprising: means for storing keywords preliminarily designated by the user; means for collecting program information related to the broadcast programs; and control means for automatically selecting a program to be recorded by checking the program information with the keywords and storing video data of the program to be recorded into a video recording file by controlling a receiver.

In order to achieve the third object, in the automatic broadcast program recorder according to the invention, the keyword storing means stores the keyword so as to be associated with a reservation identifier, and the control means stores the program information of the program to be recorded in association with the reservation identifier and controls each of the video data stored in the video recording file in association with the reservation identifier.

More specifically, the automatic broadcast program recorder according to the invention comprises, for example: a receiver for receiving video information of a plurality of channels and program information and selectively outputting the program information and a video signal of a specific channel; storing means for storing the video information outputted from the receiver; display means; data entry means operated by the user; and a recording control processor connected to the receiver and each of the means, and is characterized in that the recording control processor has a memory for storing a keyword entered from the data entry means, selects video data to be automatically recorded by checking the program information outputted from the receiver with the keyword and automatically stores the video data into the storing means by controlling the receiver and the storing means on the basis of the program information of the selected video data.

According to an embodiment of the invention, the recording control processor has a memory for storing program information of selected video information and controls the receiving means and the storing means on the basis of channel identification information and program time information included as the program information. The recording control processor has the function of displaying the status of stored video information so as to be associated with the reservation identifier on the display means. For example, by displaying the status of video information stored in the storing means in a figure corresponding to the reservation identifier in a graphical form, the user can easily grasp the status of recording.

These and other objects, features and advantages of the present invention will become more apparent in view of the following detailed description of the preferred embodiments in conjunction with accompanying drawings.

BRIEF DESCRIPTION OF THE DRAWINGS

FIG. 3 is a diagram showing an example of the configuration of a keyword table 60.

FIG. 4 is a diagram showing an example of the configuration of a program information table 70.

FIG. 8 is a diagram showing an example of the configuration of a video recording management table 90.

FIG. 9 is a diagram showing an example of the configuration of a video recording related information table 95.

DESCRIPTION OF THE PREFERRED EMBODIMENTS

Embodiments of the invention will be described hereinbelow with reference to the drawings.

Figure 1:
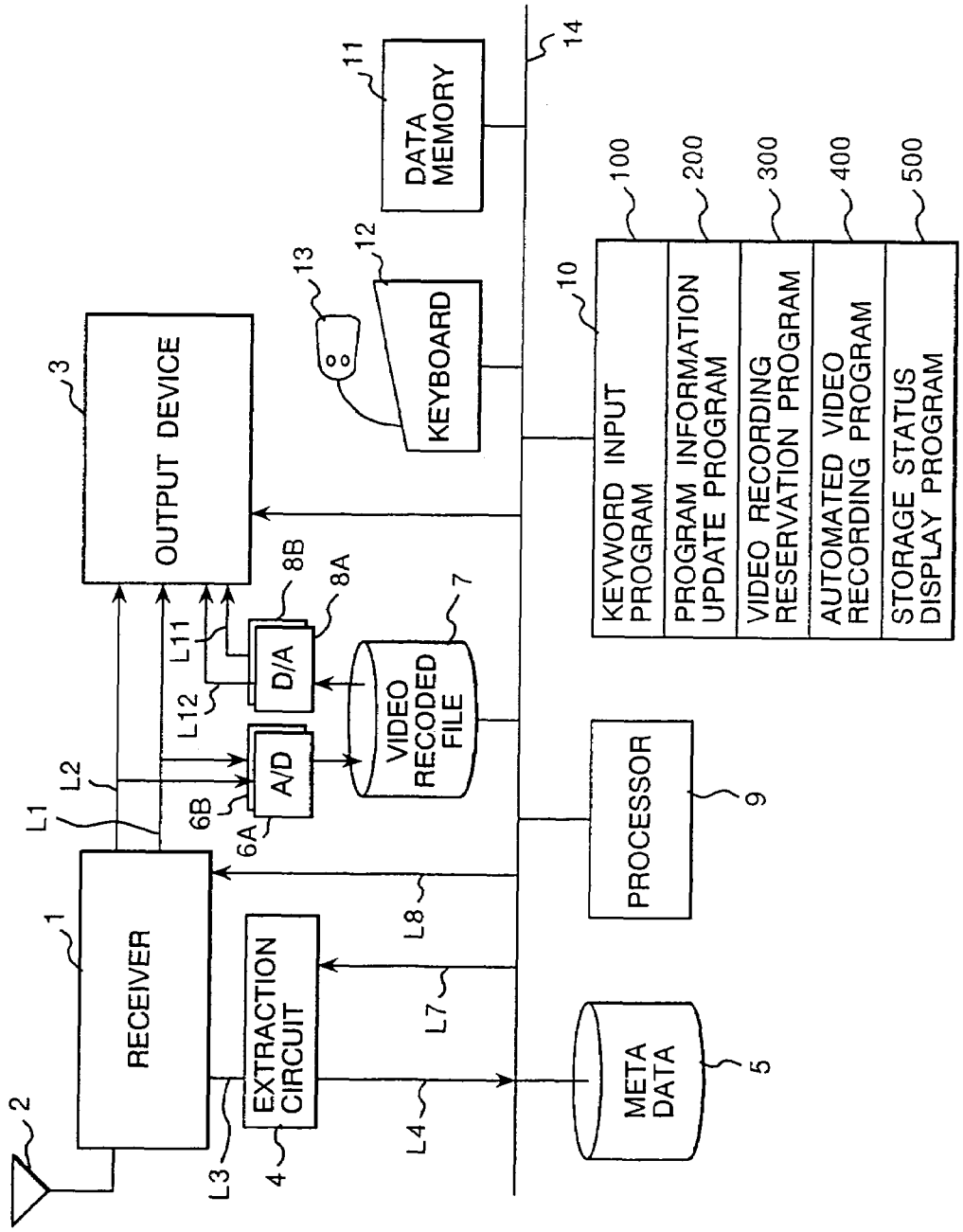
FIG. 1 is a block diagram showing an embodiment of an automatic broadcast program recorder according to the invention.

FIG. 1 is a block diagram showing an embodiment of the automatic broadcast program recorder according to the invention. In the diagram, reference numeral 1 denotes a receiver for receiving a television broadcast via an antenna 2 and 3 indicates an AV output device for receiving a video signal and an audio signal outputted from the receiver 1 to signal lines L1 and L2 and outputting them as received AV (audio and video) data. In the embodiment, as will be described in detail hereinlater with reference to FIG. 2, broadcast program information received together with the video and audio information from the antenna 2 is separated from the other information by the receiver 1, and is supplied via a signal line L3 to an extraction circuit 4.

The extraction circuit 4 extracts program data such as the channel number, date and time of a program, and keywords (hereinbelow, called meta data) characterizing each program from the broadcast program information and outputs it to a signal line L4.

Reference numeral 5 denotes a program information file for storing the program data extracted by the extraction circuit 4 in a table format; 6A and 6B A/D converters for digitizing the video signal and the audio signal outputted from the receiver 1, respectively; 7 a video recorded file for storing the video and audio signals digitized by the A/D converters; and 8A and 8B D/A converters for converting the digitized video and audio signals read out from the video recorded file 7 into analog signals. The video and audio signals outputted from the D/A converters 8A and 8B are supplied to the AV output device 3 and outputted as recorded video data.

Reference numeral 9 denotes a processor for performing a control operation necessary for the automatic broadcast recording; 10 a program memory for storing various programs to be executed by the processor 9; 11 a data memory for storing various data tables which will be described hereinlater; 12 a keyboard used to input data and commands; 13 a mouse used to move a cursor on the display screen of the output device 3 to select an icon or command displayed on the screen; and 14 an internal bus for connecting the above various elements.

Figure 2:
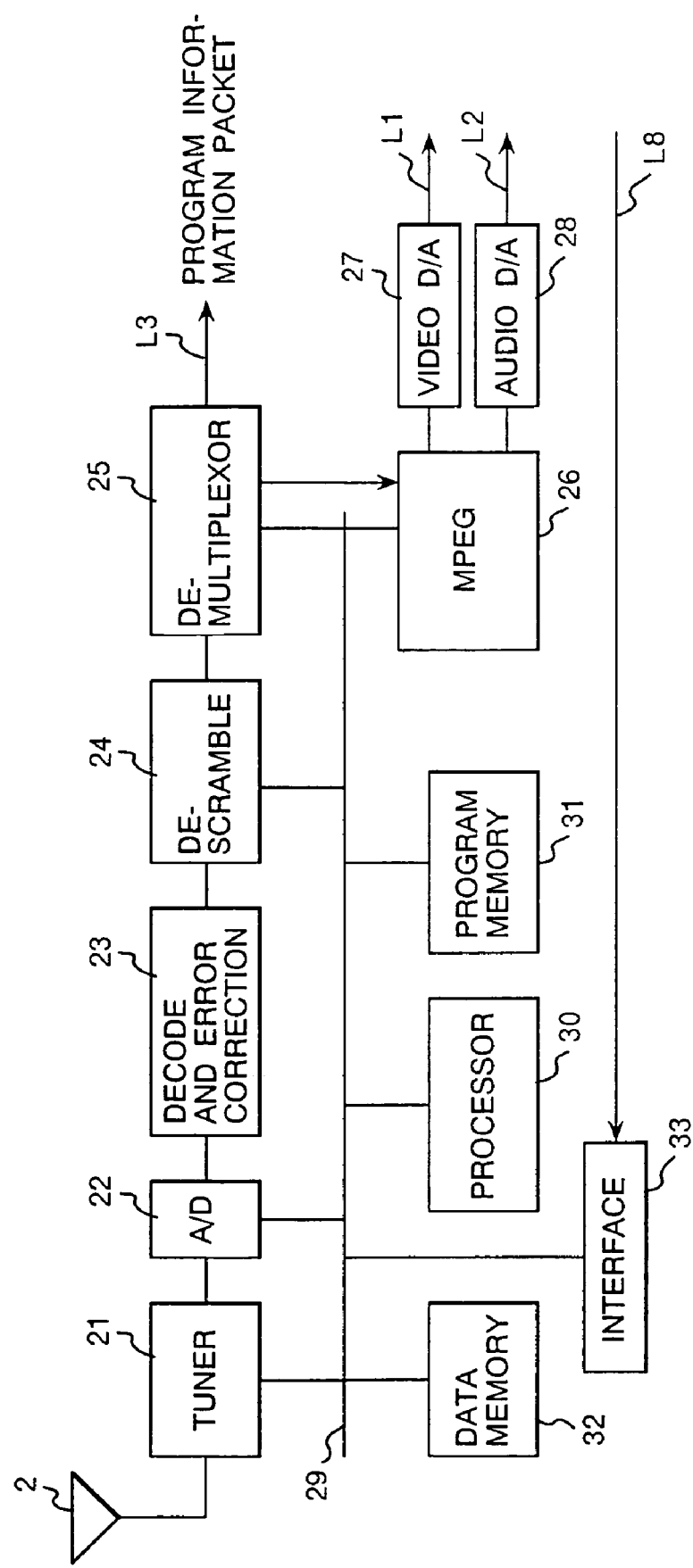
FIG. 2 is a diagram showing an example of the configuration of a receiver 1 of the automatic broadcast program recorder.

FIG. 2 shows an example of the receiver 1 applied to the automatic broadcast program recorder.

A case in which each of program information and video and audio information of a plurality of channels is broadcasted by being multiplexed in packets at each carrier frequency selected by the receiver 1 will be described.

The receiver 1 comprises: a tuner 21 connected to the antenna 2; an A/D converter 22 for converting an output signal of the tuner 21 into a digital signal; a decode and error correction circuit 23 for performing demodulation (for example, QPSK demodulation) on the output signal of the A/D converter 22 and correcting an error; a de-scramble circuit 24 for de-scrambling an encipherred packet included in a data stream outputted from the decode and error correction circuit 23; and a de-multiplexer 25 for de-multiplexing a program information packet and audio and video packets of the target program from the data (packet) stream de-scrambled.

The program information packet de-multiplexed by the de-multiplexer 25 is outputted to the signal line L3. The video packet and the audio packet of the target program are supplied to a decoder 26. In the decoder 26, the video and audio data encoded by, for example, the MPEG standard included in the packets are decoded. The digital video and audio signals outputted from the decoder 26 are converted by a video D/A converter 27 and an audio D/A converter 28 into analog signals which are outputted to the signal lines L1 and L2, respectively.

The receiver 1 further comprises an internal bus 29 for connecting the elements 21 to 26 and a receiver processor 30, a program memory 31, a data memory 32, and an interface 33 which are connected to the internal bus 29. A command from the processor 9 shown in FIG. 1 is given to the receiver processor 30 via the interface 33 and video and audio signals of an arbitrary channel designated by the processor 9 are fetched to the signal lines L1 and L2. A receiver having a configuration similar to that of FIG. 2 is introduced in, for example, Journal of The Institute of Image Information and Television Engineers, Vol. 51, No. 9, pp 1364 to 1369.

Various data tables formed in the data memory 11 and the program information file 5 will be described hereinbelow.

FIG. 3 shows a keyword table 60 formed in the memory 11.

The keyword table 60 includes of a plurality of records 60-1, 60-2, . . . and each record includes a reservation number 61 and a plurality of corresponding keywords 62. As keywords in this case, for example, words indicative of the kind of the program, the title name of a movie or drama, name of a singer or actor, the kind of sports, team name, and the like can be mentioned.

The keyword table 60 is created in such a manner that the user enters the reservation number and the keywords on the entry screen generated by a key input program 100 by operating the keyboard 12 or mouse 13.

FIG. 4 shows a program information table 70 formed in the program file 5.

Each of records 70-1, 70-2, . . . of the program information table 70 is comprised of channel number 71, data 72 of date and time of the program (start time and end time), and a plurality of words 73 (meta data) indicative of the contents of the program. The data is extracted from the program information packet by the extraction circuit 4.

The program information is repeatedly broadcasted, for example, in a form of updating information of one week every data by using the program information packet of each data stream. When the broadcast frequency band is divided into (m) channels and video images of (N) channels are broadcasted by being multiplexed in packets at each frequency, video images of total (N×m) channels can be received. When the program information packet in the data stream sent at a frequency includes program information of (N) channels broadcasted by the data stream, in order to collect the program information of all of the channels in the frequency band, it is necessary to extract the program information while switching the receiving frequency by the tuner 21. On the contrary, when it is set so that the program information packet includes all of program information of the (N×m) channels in the data stream at any frequency, all of program information can be collected at an arbitrary selected frequency.

A program information update program 200 is executed periodically in cycles according to the updating frequency of the program information broadcasted and activates the extraction circuit 4 via a signal line L7. In the case of a broadcast form of providing all of program information by one data stream, the program information table 70 can be edited by arranging data outputted from the extraction circuit 4 within a predetermined period. In the case of a broadcast form which requires the switching of the receiving frequency, the receiver 1 is instructed via the signal line L7 to switch the frequency. By repeating the above-mentioned operation every frequency, the program information table 70 can be edited.

Figures 5, 6:
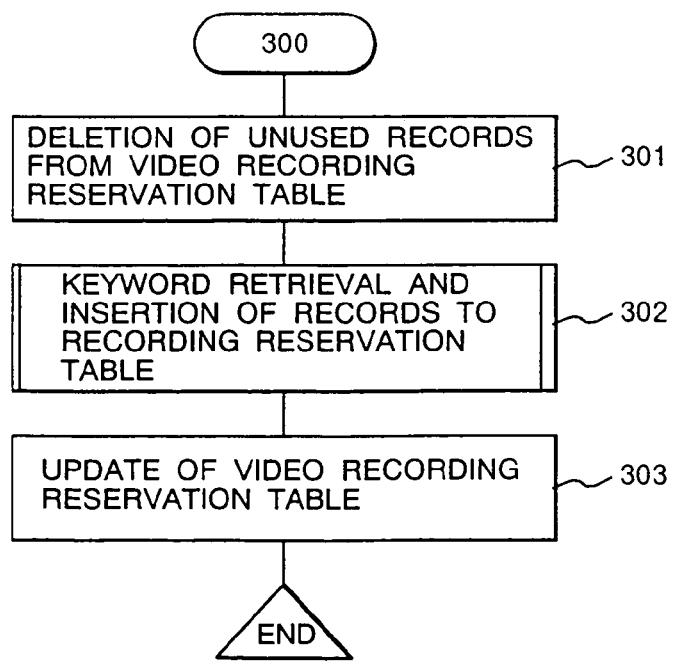
FIG. 5 is a diagram showing an example of the configuration of a video recording reservation table 80.
FIG. 6 is a flowchart showing the function of a video recording reservation program 300.

FIG. 5 shows the structure of a video recording reservation table 80 generated by matching the keyword table 60 with the program information table 70.

The video recording reservation table 80 is comprised of a plurality of reservation records 80-1, 80-2, . . . and each reservation record includes, for example, reservation number 81, channel number 82, date and time 83 of the program (start time and end time of the program), meta data 84, matching ratio 85, and status code 86. The reservation number 81 is the same as the reservation number 61 registered in the keyword table 60. The program information such as the channel number 82, date and time 83 and meta data 84 is copied from the program information table 70. In place of the meta data 84, a keyword matched with the meta data may be stored. The matching ratio 85 shows the result of the matching between the keywords 62 registered in the keyword table 60 and the meta data 73 included in the program information table 70.

The status code 86 indicates the status of each reservation record and "0" is set in the initial status. For example, when the meta data set in one program satisfies the retrieval condition in a plurality of reservation numbers registered in the keyword table 60, a plurality of records of the same program with different reservation numbers are formed in the video recording reservation table 80. In this case, a record of the smallest reservation number is left as a recording management target. In the other records of the same program, the status code is set to "1" ("overlapped"). With respect to a record cancelled by the user when the data of the video recording reservation table is displayed, the status code is set to "2", indicative of "cancellation of recording". "3" indicative of "recording" is set for the record of the program being recorded, and "4" indicative of "recorded" is set for the record of the program which has been recorded.

Although the reservation records are arranged in accordance with the order of reservation numbers in FIG. 5, the reserved records may be also arranged, for example, in accordance with the order of program start time or the order of reservation numbers.

FIG. 6 shows a flowchart of a video recording reservation update program 300 for updating the video recording reservation table 80.

The video recording reservation update program 300 is automatically executed when the data in the keyword table 60 is changed or when the program information table 70 is updated. First, an unused record is deleted from the video recording reservation table 80 (step 301). The records to be deleted are a record of a recorded program (status code "4") and an overlapped record (status code "1") of which programs have been finished. The keyword table 60 and the program information table 70 are checked with each other, a newly retrieved program is inserted to the video recording reservation table 80 (step 302) and a process of updating the video recording reservation table is performed (step 303).

In step 303 of the updating process, for example, the records in the video recording reservation table 80 are sorted in accordance with the order of the date and time of programs or the order of reservation numbers. When there is a record of which broadcast time is partially or entirely overlapped with that of another record, except for the case where the program is the same, one of the records is left and the other overlapped record is deleted.

For example, when the reservation numbers are set according to the priority, the record of the smaller reservation number is left and the other record whose broadcast time is overlapped is deleted. When a plurality of records of the same reservation number which are overlapped with respect to time exist, a record of which program start time is the earliest or a record of the program having a higher matching ratio may have the priority. In the case of allocating the priority irrespective of the reservation number, by storing the priority information in the keyword table 60 and allowing each record in the video recording reservation table 80 to include the priority information, the record selection can be performed by using the priority information. Some users wish to watch a number of programs at the sacrifice of one program rather than to watch one long program at the sacrifice of a number of short programs. It is therefore desirable that the rule of giving the priority among a plurality of programs of different broadcast time can be determined by each user.

In the table 80 after checking the overlapping of the broadcast time, records of the same program are detected and the status code is set to "1" indicative of "overlapped", thereby obtaining the video recording reservation table 80 where programs which can be recorded are arranged in accordance with the order of program start time.

Figure 7:
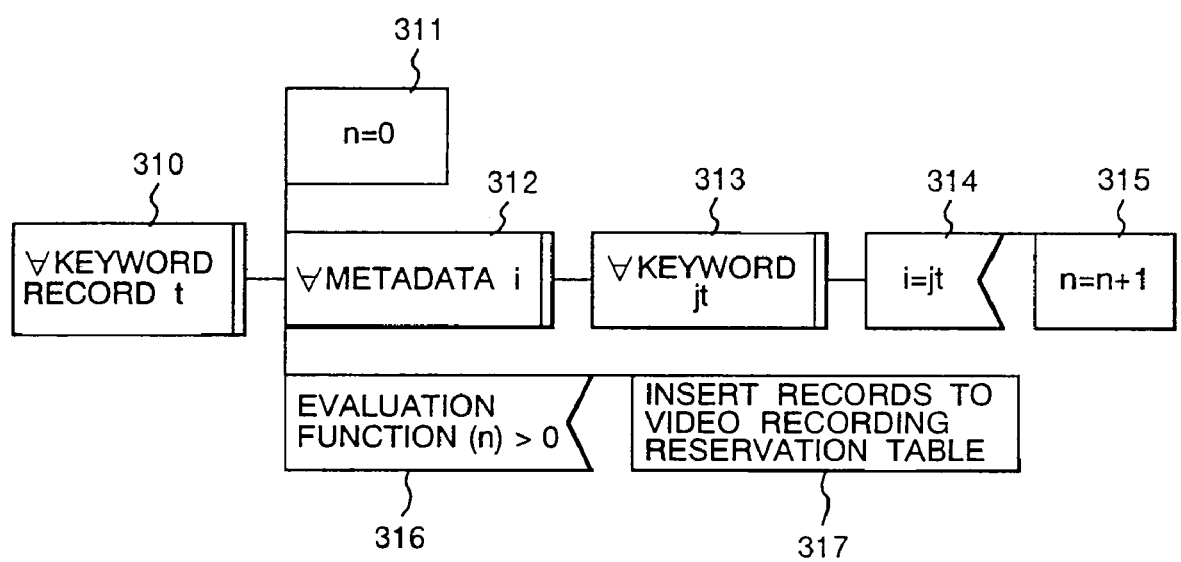
FIG. 7 is a diagram showing the details of a retrieving step 302 in the video recording reservation program 300.

FIG. 7 shows the details of step 302 of matching the keyword table 60 with the program information table 70 in the video recording reservation update program 300.

Each of the records in the keyword table 60 is checked with all of records in the program information table 70 and whether the record is a program to be reserved or not is determined on the basis of the matching ratio between the keyword 62 and the meta data 73.

In FIG. 7, the sign ∀ denotes that, when there are a plurality of data or records, the data or records are sequentially selected while changing the value of a variable. For example, step 310 denotes that, by changing the value of a variable (t), records (60-$t$) inserted in the keyword table 60 are sequentially designated and the following procedures 311 to 317 are repeated with respect to all of the records registered in the keyword table 60.

First, the value of a variable (n) indicative of the matching ratio is set to the initial value 0 (step 311). After that, all of the meta data 73 registered in a record 70-$i$ in the program information table 70 (step 312) is sequentially compared with all of the keywords 62 (step 313) registered in the keyword record 60-$t$ (step 314). When matched, one is added to the variable (n) (step 315). When the check of all of the meta data of the program information record 70-$i$ with respect to all of keywords of one keyword record 60-$t$ is completed, the value of the variable (n) indicative of the matching ratio is evaluated by an evaluation function (step 316). When the evaluation result is positive, the program information record 70-$i$ is registered to the video recording reservation table 80 (step 317). In this case, the video recording reservation table 80 is checked. Only when the same record does not exist, it is registered as a new record.

When the evaluation function is (n), a program having one or more meta data which matches with the keywords is to be recorded. When the evaluation function is (n−T), a program having the number (n) of matches equal to or larger than the threshold (T) is to be recorded. When the evaluation function is set to n/Ni−Ti or n/Kjt−Tjt (where Ni denotes the number of meta data registered in the program information record 70-*i*, Kjt denotes the number of keywords registered in the keyword record 60-*t*, and Ti and Tjt are threshold values), a program having a matching ratio erual to or higher than a predetermined threshold value as to the number of meta data or the number of keywords is to be registered.

It is also possible to preliminarily assign a weight Wjt to each keyword, store the weighted keyword in the keyword table 60, and add the weights of the matched keywords, thereby calculating the matching ratio (n).

FIGS. 8 and 9 show a video recording management table 90 and a video recording related information table 95, respectively, formed in the data memory 11 by an automated video recording program 400 which will be described hereinlater.

The video recording management table 90 is comprised of a plurality of records 90-1, 90-2, . . . each showing the relation between reservation number 91 and file name 92 of each video data (including audio data) stored in the video recorded file 7. As shown by the records 90-2 and 90-3, when the same program matches a plurality of retrieval conditions of different reservation numbers, different records are generated. The video recording related information table 95 indicates the relation between the file name 92 of the video data and the program information. In the embodiment, the program information includes date and time 93 of the program and meta data 94 obtained from the video recording reservation table 80.

Figure 10:
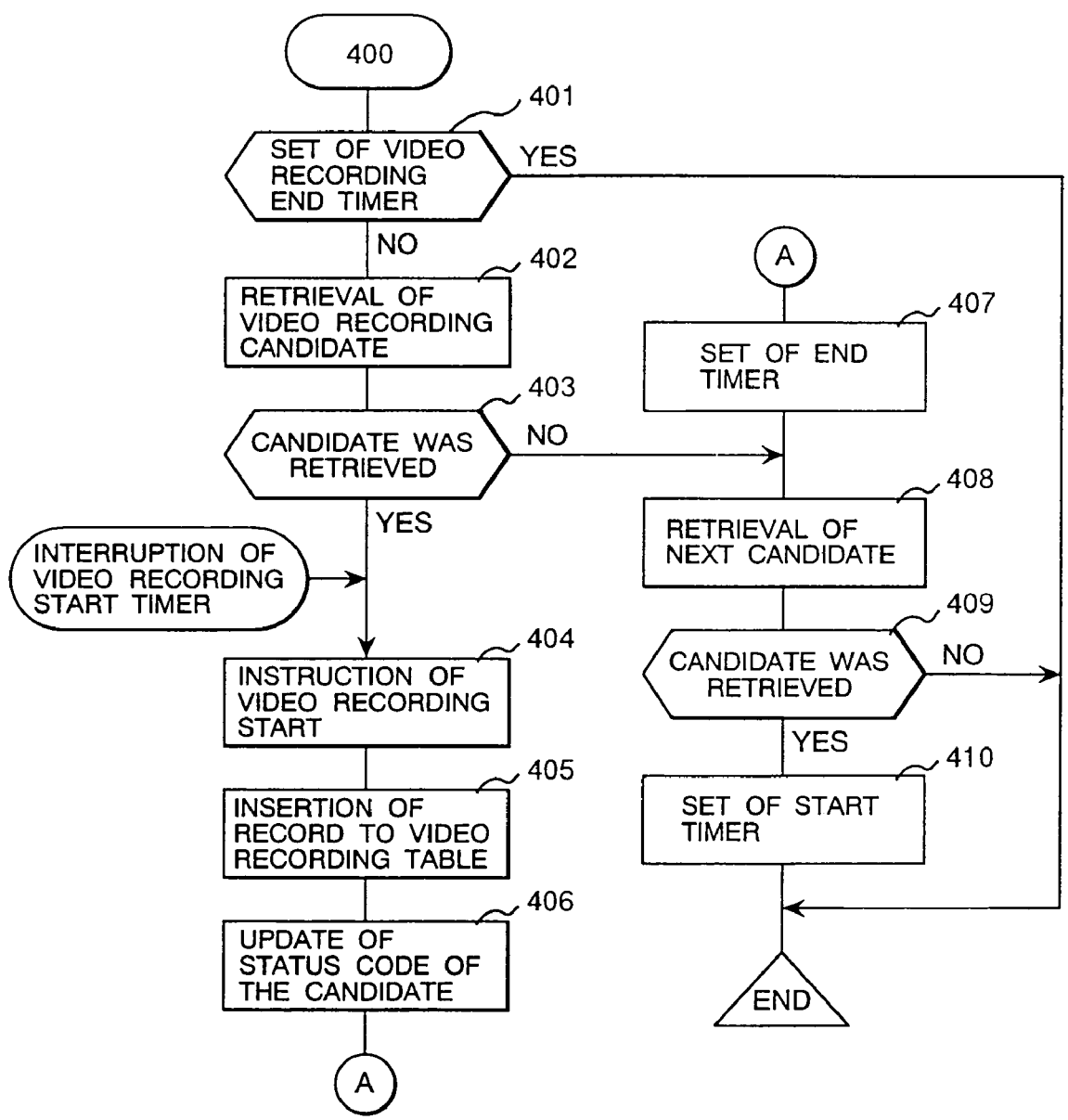
FIG. 10 is a flowchart showing the function of an automated video recording program 400.

FIG. 10 shows the flowchart of the automated video recording program (routine) 400.

The automated video recording program 400 is executed when the video recording reservation update program 300 is finished or an interruption is generated from a video recording start timer which will be described hereinlater. First, a check is made to see whether a video recording end timer is set or not (step 401). The video recording end timer is used to generate a timer interruption at the time point when a program being recorded is finished. When the video recording end timer is set, it denotes that video data is being recorded into the video recording file 7 at present. In this case, this routine is finished without performing any operation.

When the video recording end timer is not set, whether or not there is a program to be recorded (hereinbelow, called a video recording candidate) is checked with reference to the video recording reservation table 80 (step 402). The video recording candidate is determined by checking whether the program has started or not by comparing the start time of the program stored in the date and time 83 of the program in the video recording reservation table 80 with the present time. When no video recording candidate is retrieved, the routine advances to step 408 where the next video recording candidate is retrieved.

When a video recording candidate is retrieved in step 402, the channel number 82 is designated and start of recording is instructed to the receiver 1 via a signal line L8. In FIG. 5, each program reserved to be recorded can be specified by the channel number 82 and the date and time 83 of the program. If the receiver 1 needs the designation of the selected frequency to specify the program, it is sufficient to store a frequency identifier in each video recording reservation record 80-*i* and indicate the receiving frequency to the receiver 1 when the start of recording is instructed.

When the video recording instruction is received, the receiver 1 sets the tuner 21 at the target frequency, de-multiplexes the video packet and the audio packet of the designated channel from the received data stream by the de-multiplexer 25, and outputs an audio signal and a video signal to be recorded to the signal lines L1 and L2. The signals are converted into digital signals by the A/D converters 6A and 6B, in order to store into a video recording file 7.

At this time, a new file name 92 is given to the video recording program and a new record indicative of the video recording program is registered to each of the video recording management table 90 and the video recording related information table 95 on the basis of the file name 92 and the contents of the record determined as the video recording candidate in the video recording reservation table 80 (step 405). In the video recording reservation table 80, the status code 86 of the video recording candidate is updated to a code indicating that the program is being recorded (step 406) and the program end time stored in the record of the video recording candidate is set to the video recording end timer (step 407).

In step 408, the next video recording candidate whose program start time is the closest to the present time is retrieved from the video recording reservation table 80. If there is no video recording reservation record corresponding to the next video recording candidate, this routine is finished. When there is a video recording reservation record corresponding to the next video recording candidate, the program start time stored in the record is set in the video recording start timer (step 410) and this routine is finished.

As described above, by setting the video recording start timer with respect to the next video recording candidate when the automated video recording program 400 is executed, an interruption can be generated at the video recording start time. By instructing the video recording start of step 404 at the time of occurrence of the interruption from the video recording start timer, the video recording candidates can be sequentially selected from the records registered in the video recording reservation table 80 and the video recording instruction can be generated by the timer interruption.

Figure 11:
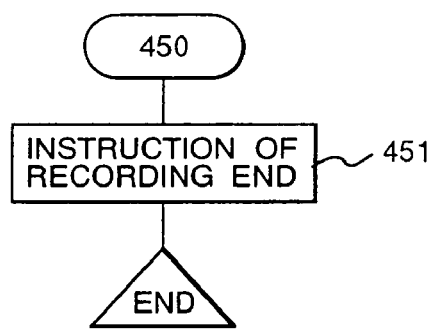
FIG. 11 is a flowchart showing the function of a recording end program.

When the interruption is generated from the video recording end timer, as shown in FIG. 11, an instruction of recording end is issued to the receiver 1 to stop the operation of storing data in the video recording file 7 (step 451). Since new time is set at the start of the recording of the next video recording candidate in the video recording end timer, the video recording operation can be automatically alternately started and finished according to the date and time of the program (start time and end time of the program) provided as program information.

Even when the recording operation is completed with respect to all of the records registered in the video recording reservation table 80, the automated video recording reservation program 400 is executed at the time point when a new reservation record is added to the video recording reservation table 80 by the video recording reservation update program 300. Consequently, video images of new programs can be sequentially stored in the video recording file 7. Each time a new video image (program) is stored in the video recording file 7, new records are added to the video recording management table 90 and the video recording related information table 95 shown in FIGS. 8 and 9 and a video recording file peculiar to each user is created in correspondence with each reservation number.

The status of stored video data in the video recording file 7 can be notified to the user by outputting the data in the video recording management table 90 and video recording related information table 95 in an appropriate display form on the display screen of the AV output device 3. Further, when the user specifies a program on the storing status display screen, by accessing the video recording file 7 with the file name corresponding to the program, or when the user specifies a reservation number, by accessing the video recording file 7 with the file name corresponding to the reservation number, stored images can be read out from the video recording file 7 and outputted on the display screen.

FIG. 12 shows an example of the recording status display screen indicative of the status of video data stored in the video recording, file 7.

Figure 12A:
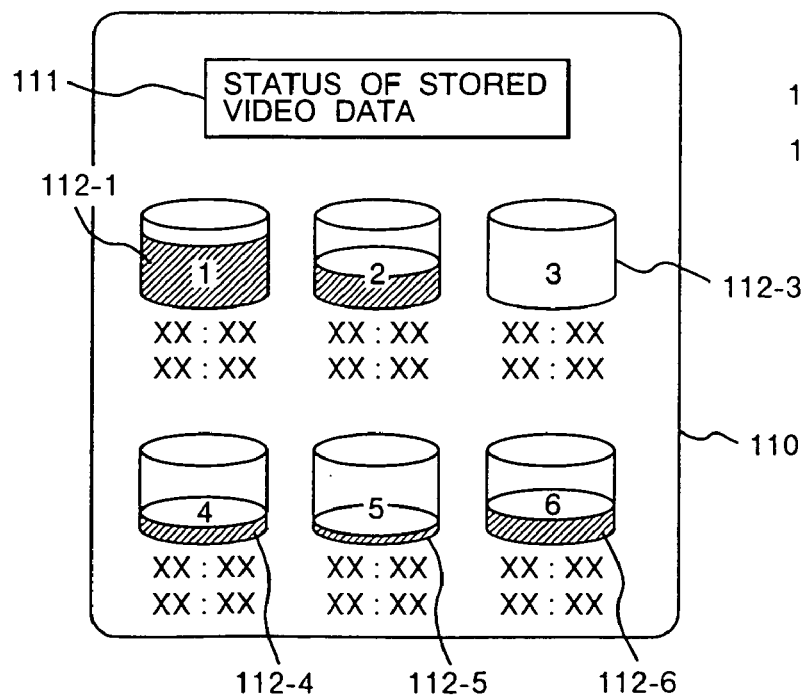
FIG. 12 is a diagram showing an example of a recording status display screen 110.

In FIG. 12(A), reference numeral 110 denotes a display screen or a window formed in a part of the display screen, 111 denotes a title of the screen, and 112 (112-1 to 112-6) indicate cylindrical figures (icons) each indicative of the video recording file corresponding to the reservation numbers 61 and 91.

Figure 12B:
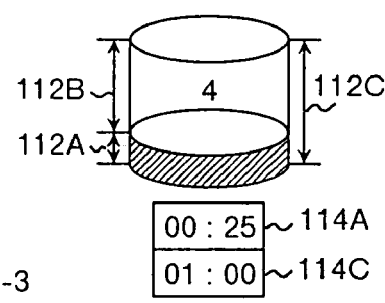

In the embodiment, as shown in FIG. 12(B), each cylindrical FIG. 112 is displayed as a graph comprised of a present data storage amount 112A shown by a hatched part and a memory remaining amount 112B shown by a white part. To each cylindrical FIG. 112, numeral 113 indicative of the reservation number, numeral 114C indicative of recording time corresponding to the full length 112C of the cylinder, and numeral 114A indicative of recording time corresponding to the data storage amount 112A are indicated.

By displaying the status of stored video data in the video recording file 7 in a graph corresponding to the reservation number as mentioned above, the operating environment in which the recording status can be recognized at a glance and a file to be reproduced can be easily designated can be provided to the user. In the case of displaying the stored data amount in a graph by using a file corresponding to the reservation number, it is necessary to preliminarily allocate a file capacity (recording time) for each reservation number. It is sufficient to display a schematic video recording capacity (recording time) of the video recording file 7 on the keyword entry screen, allow the user to designate the recording file capacity of each reservation number at the time of registering keywords, and store the recording file capacity in the keyword table 60. Alternatively, it is also possible to equally proportionally divide the storage capacity of the video recording file 7 into the number of video recording files which have been reserved and to display the storage data amounts of the video recording files in a bar graph.

Formation of a video recording file with a new reservation number and updating of the registered keyword can be performed by using the recording status display screen 110. For example, when one (112-i) of the plurality of displayed cylindrical figures (icons) is designated by the cursor and double-clicked by the user, the keyword entry screen of the reservation number shown by the designated icon is displayed. When the mouse is clicked, the display screen of program information regarding the video data stored in the video recording file of the reservation number is displayed.

On the keyword entry screen, the user can enter an arbitrary keyword from the keyboard 12. In place of the inputting operation from the keyboard, a method of displaying a group of prepared keywords on an entry screen 120 as shown in FIG. 13 and selecting the keyword from the group by the mouse operation of the user may be used.

Figure 13:
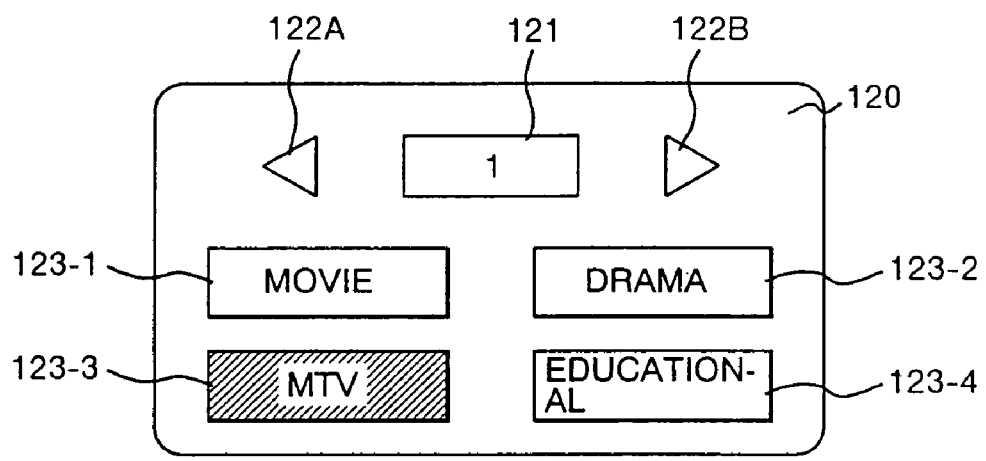
FIG. 13 is a diagram showing an example of a keyword entry screen.

Shown in FIG. 13 are a display area 121 of the reservation number, button areas 122A and 122B to increase or decrease the reservation number displayed in the display area 121, and examples 123-1 to 123-4 of the keywords. In the embodiment, a plurality of words indicative of types of the programs are displayed on the first entry screen. When one of the words is selected, the group of words related to the type is displayed on the next screen. The user is allowed to sequentially select the keywords while scrolling the screen as necessary. In this case, for example, as shown by a word 123-3, when the word selected by the user is inverted in each of the entry screens, the keyword entered by the user can be easily grasped.

Figure 14:
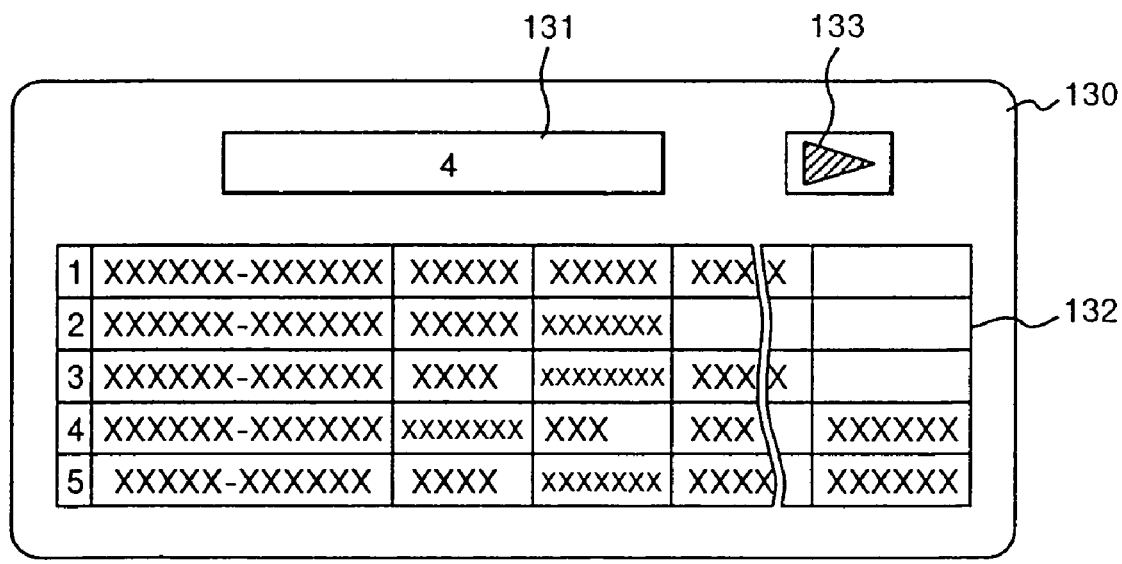
FIG. 14 is a diagram showing an example of a display screen of program information regarding stored video data.

FIG. 14 shows an example of a display screen 130 of program information related to the video data stored in the video recording file. Reference numeral 131 denotes a display area of the reservation number, 132 denotes a display area of program information recorded, and 133 indicates a button area for instructing reproduction of the recorded video data.

In the display screen 110 of the status of stored video data shown in FIG. 12, when any icon 112-i indicative of the video recorded file is clicked, the reservation number corresponding to the icon is displayed on the number display area 131 and program information (for example, the date and time 93 of the program and the meta data 94) of the recorded video file corresponding to the reservation number obtained by retrieving the video recording management table 90 and the video recording related information table 95 is displayed on the program information display area 132.

On the other hand, when the screen title area 111 is clicked on the display screen 110 of the video data stored status, a character train such as "ALL" indicative of the whole recorded video file 7 is displayed on the number display area 131, and the program information of all of the video recorded files stored in the video recording related information table 95 is displayed in the program information display area 132. When the extraction circuit 4 can extract the program title so as to be distinguished from the other general meta data from the program information packet received by the antenna, the program title is stored as another item in the tables 80 and 95 and displayed in the display area 132.

When the user designates any of the program records displayed in the display area 132 and clicks the reproduction button area 133 on the program information display screen 130, the recorded video data of the designated program is read out from the video recorded file 7 and outputted onto the display screen.

When all of the programs are designated and the reproduction button is clicked, or when the reproduction button is clicked without designating any program record, all of the programs in the display area 132 are sequentially read out from the video recorded file and displayed on the display screen.

The reproduced video data may be automatically deleted from the video recorded file 7. It is also possible to provide an area for designating data deletion in the display area 132 of the program information display screen 130 and delete the video recording data and the management data from the video recorded file 7 and the tables 90 and 95 with respect to the program designated by the user after reproduction.

Although the case of receiving the video information (including audio information) and the program information by a single receiver has been described in the foregoing embodiment, when the program information is supplied by a communication medium different from that for the video information or at a different carrier frequency, it is sufficient to provide a receiver dedicated to the program information. Although the case of receiving the video information and program information from the antenna has been described in the embodiment, the information may be supplied from a line of the internet, CATV, or the like.

As obviously understood from the foregoing embodiment, according to the invention, by preliminarily registering keywords, a desired program can be automatically recorded. Consequently, inconvenience such that the user performs a recording operation for each program by checking the program table is eliminated. The group of keywords is registered so as to be associated with the recording file identifiers (reservation numbers) and data of each retrieved program is controlled in association with the recording file identifier, thereby enabling the stored video data to be provided as some special files characterized by the keywords to the user. The user can therefore reproduce video data of each special file.

While the present invention has been described above in conjunction with the preferred embodiment, one of ordinary skill in the art would be enabled by this disclosure to make various modifications to this embodiment and still be within the scope and spirit of the invention as defined in the appended claims.

What is claimed is:

1. A video recording control method for a reservation type video recorder, the method comprising the steps of:
   extracting program specifying information of various broadcast programs from a data stream of program information and storing the program specifying information as a plurality of program information records corresponding to the broadcast programs into a program information table;
   storing plural group of keywords pre-designated by a user into a keyword table in association with a reservation identifier for each keyword group;
   comparing each of keywords stored in said keyword table with the program specifying information stored in said program information table and calculating, for each reservation identifier, a keyword matching ratio by broadcast program in accordance with the number of keywords matched with the program specifying information;
   creating a plurality of reservation records in association with each reservation identifier in a video recording reservation table depending on the matching ratio, each of said reservation records indicating the program specifying information corresponding to a broadcast program to be recorded;
   recording the contents of broadcast programs into a video file according to the reservation records of said video recording reservation table; and
   storing a file name of each of the broadcast programs having been recorded in the video file, into a video recording management table in association with the reservation identifier.

2. The video recording control method according to claim 1, wherein said program specifying information includes meta-data indicative of the contents of a broadcast program, a channel number of the broadcast program, and time information indicating broadcast time of the program.

3. The video recording control method according to claim 2, wherein each of keywords stored in said keyword table is compared with the meta-data stored as a part of the program identification information in said program information table,
   wherein the number of keywords matched with the meta-data is evaluated for each keyword group with an evaluation function, and
   wherein a new reservation record is created in said video recording reservation table with respect to a broadcast program for which the evaluation results is positive.

4. The video recording control method according to claim 1, wherein each of said reservation records includes a channel number of the broadcast program and time information indicating broadcast time of the broadcast program as a part of said program identification information, and the matching ratio of the broadcast program.

5. The video recording control method according to claim 1, wherein each of said keywords is pre-assigned a weight, and said matching ratio by broadcast program is calculated in accordance with the total weight value of the keywords matched with the program specifying information for each keyword group.

6. The video recording control method according to claim 1, wherein each of said reservation records includes a status code for controlling video recording of a broadcast program specified by the program specifying information in the reservation record, and
   wherein an initial value of the status code is determined by comparing the program specifying information with that of the other reservation records in said video recording reservation table.

7. The video recording control method according to claim 6, wherein said status code indicates one of an overlapped entry which means that at least one reservation record having the same program specifying information has been registered in said video recording reservation table before the record, a canceled entry which means that the record has been invalidated by the user, a recording entry which means that the broadcast program specified by the record is being recorded, and a recorded entry which means that recording of the broadcast program specified by the record has been completed.

8. The video recording control method according to claim 1, further comprising the steps of:
   comparing the contents of said reservation records with one another and selecting one of broadcast programs to be recorded in accordance with a rule designated by the user when it is found that at least two broadcast programs having the broadcast time overlapped with each other are reserved in said video recording reservation table, and invalidating the other from the video recording reservation table.

9. The video recording control method according to claim 1, further comprising the step of:
   updating said video recording reservation table by automatically comparing said keywords with said program specifying information when the contents of said keyword table or program information table are changed.

* * * * *